United States Patent
Morisawa

(10) Patent No.: US 7,590,871 B2
(45) Date of Patent: Sep. 15, 2009

(54) ELECTRONIC APPARATUS AND METHOD OF SETTING AN OPERATION MODE OF THE SAME

(75) Inventor: Toshikazu Morisawa, Tokorozawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 432 days.

(21) Appl. No.: 10/705,835

(22) Filed: Nov. 13, 2003

(65) Prior Publication Data

US 2004/0107372 A1 Jun. 3, 2004

(30) Foreign Application Priority Data

Nov. 29, 2002 (JP) ............... 2002-347498

(51) Int. Cl.
G06F 1/00 (2006.01)
G06F 1/26 (2006.01)
G06F 1/32 (2006.01)

(52) U.S. Cl. ............... 713/300; 713/320; 713/502

(58) Field of Classification Search ........... 713/300, 713/320, 322, 323, 324, 500, 502; 718/1, 718/100
See application file for complete search history.

(56) References Cited

U.S. PATENT DOCUMENTS

| | | | | |
|---|---|---|---|---|
| 4,718,007 A * | 1/1988 | Yukino | ............. | 713/330 |
| 6,189,106 B1 * | 2/2001 | Anderson | ............. | 713/300 |
| 6,396,675 B1 * | 5/2002 | Su | ............. | 361/103 |
| 6,408,395 B1 * | 6/2002 | Sugahara et al. | ........... | 713/310 |
| 6,748,546 B1 * | 6/2004 | Mirov et al. | ............. | 713/320 |
| 6,928,567 B2 * | 8/2005 | Nakai | ............. | 713/340 |
| 7,069,462 B2 * | 6/2006 | Owen et al. | ............. | 713/502 |
| 2002/0140400 A1 | 10/2002 | Hatori et al. | | |
| 2003/0009705 A1 * | 1/2003 | Thelander et al. | ......... | 713/340 |
| 2004/0107339 A1 * | 6/2004 | Morisawa et al. | .......... | 713/2 |

FOREIGN PATENT DOCUMENTS

| | | |
|---|---|---|
| JP | 5-30315 | 2/1993 |
| JP | 8-87818 | 4/1996 |
| JP | 9-34646 | 2/1997 |
| JP | 11-65712 | 3/1999 |
| JP | 11-110085 | 4/1999 |
| JP | 11-191262 | 7/1999 |
| JP | 2000-215002 A | 8/2000 |

(Continued)

OTHER PUBLICATIONS

Use Power Schemes for the Tablet PC, Microsoft, Nov. 7, 2002, microsoft.com/windowsxp/using/tabletpc/learnmore/powerschemes.mspx?pf=true.*

(Continued)

Primary Examiner—Mark Connolly
(74) Attorney, Agent, or Firm—Finnegan, Henderson, Faraow, Garrett & Dunner, L.L.P.

(57) ABSTRACT

An operation mode control program is a program for carrying out an operation mode changeover control. A user interface section sets time zone corresponding to each operation mode. A time acquire section periodically acquires system time from an internal clock section of an operating system, and transfers the system time to an operation mode changeover section. The operation mode changeover section carries out the operation mode changeover control in accordance with time zone set by the user interface section while receiving the system time from the time acquire section.

6 Claims, 5 Drawing Sheets

FOREIGN PATENT DOCUMENTS

| JP | 2000-295768 | 10/2000 |
|---|---|---|
| JP | 2000-295768 A | 10/2000 |
| JP | 2000-322161 | 11/2000 |
| JP | 2000-29576 A | 1/2001 |
| JP | 2001-274928 | 10/2001 |

OTHER PUBLICATIONS

Translation—Shimada Eija, JP-11065712 A.*
Translation of Jap Pat-No. JP-11-65712 published Mar. 9, 1999.*
Notification of Reasons for Rejection issued by Japanese Patent Office in Feb. 8, 2005, in Japanese Application No. 2002-347498.
U.S. Appl. No. 10/715,526, filed Nov. 19, 2003, to Morisawa et al.
European Search Report dated Jun. 15, 2006, from the European Patent Office in a corresponding European Patent Application No. 03025395.9-2224.
Notification of Reasons for Rejection from Japanese Patent Office mailed Jul. 17, 2007, in Japanese Patent Application No. 2005-112352.
Decision of Rejection from Japanese Patent Office mailed Jan. 22, 2008, in Japanese Patent Application No. 2005-112352, and English translation thereof (4 pages total).

* cited by examiner

| 8:00 | 9:00 | 10:00 | 11:00 | 12:00 | 13:00 | 14:00 | 15:00 | 16:00 | 17:00 | 18:00 |
|------|------|-------|-------|-------|-------|-------|-------|-------|-------|-------|
| Normal mode ||| | Power saving mode |||| Normal mode |||
FIG. 4
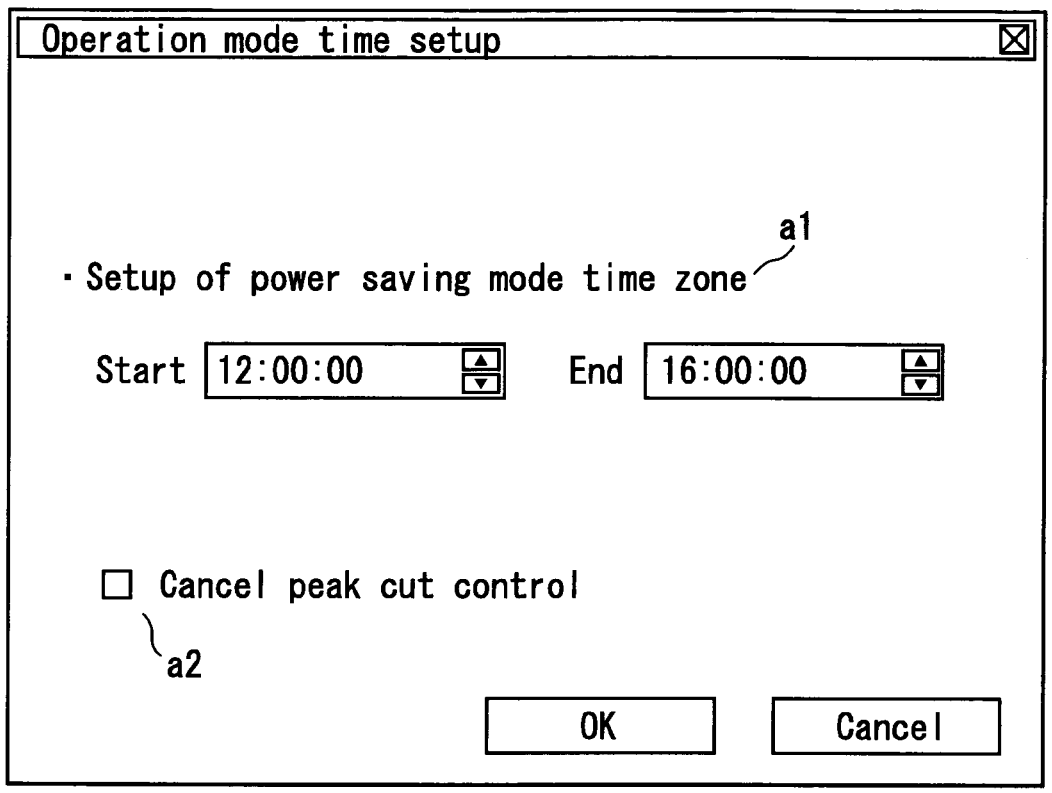
FIG. 5
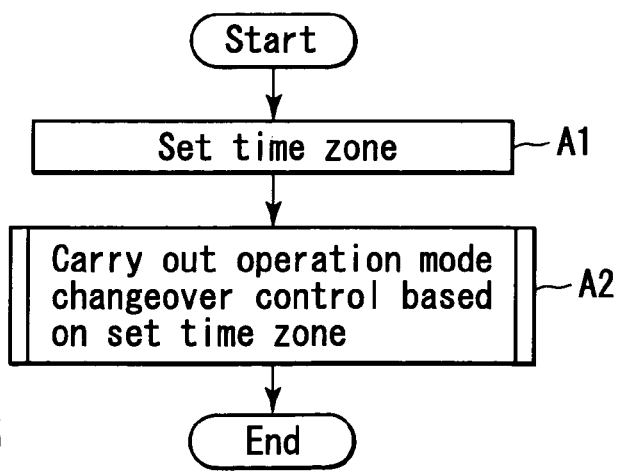
FIG. 6

ELECTRONIC APPARATUS AND METHOD OF SETTING AN OPERATION MODE OF THE SAME

CROSS-REFERENCE TO RELATED APPLICATIONS

This application is based upon and claims the benefit of priority from the prior Japanese Patent Application No. 2002-347498, filed Nov. 29, 2002, the entire contents of which are incorporated herein by reference

BACKGROUND OF THE INVENTION

1. Field of the Invention

The present invention relates to an operation control technique applied to electronic apparatuses such as personal computers.

2. Description of the Related Art

In recent years, various electronic apparatuses driven by both battery and external power source (AC commercial utility source) have been developed and come into wide use. For example, portable (mobile) information terminals called PDAs (Personal Digital Assistants), notebook-sized personal computers or digital cameras are given as typical electronic apparatuses.

Recently, the protection of the environment has attracted a great interest; for example, the following study has been made to prevent global warming. Power consumption concentrating on the daytime is reduced (peak cut) and shifted (peak shift), and thereby, the environmental load of power generation facilities is made small. In view of such circumstances, it is necessary to properly change the operation mode in accordance with time zone in this kind of electronic apparatus. Namely, a normal mode for normal operation and a power saving mode for power saving operation are properly changed in accordance with power consumption concentrating time zone (peak time zone) such as daytime and other time zone.

For example, in an automatic teller machine (ATM), the power supply on/off control to each unit is automatically carried out for every time zone (e.g., JPN. PAT. APPLN. KOKAI Publication No. 2000-295768).

In this kind of electronic apparatus, it is general that the following work must be done in carrying out an operation mode changeover. Namely, it is necessary that an operation mode setup screen is displayed, and thereafter, to reset the operation mode on the screen.

However, it is not preferable to entrust the work described above to users resulting from the following reasons. The possibility of actually carrying out the operation is low because the operation is troublesome, and users carelessly forget the operation even if they have their will to carry it out.

According to automatic control carried out every time zone in the automatic teller machine (ATM), the power supply on/off control to each unit is merely changed.

BRIEF SUMMARY OF THE INVENTION

According to an embodiment of the present invention, an electronic apparatus having several operation modes, comprises an operation mode setting unit configured to set the operation modes; a time setting unit configured to set time information for carrying out each operation mode; and a control unit configured to carry out an operation mode changeover in accordance with the time set by the time setting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 4 is a view to explain electronic apparatus operation modes used in accordance with time zone assumed in the embodiment;

FIG. 5 is a view showing an operation mode time setup screen displayed on the electronic apparatus of the embodiment;

FIG. 6 is a first flowchart to explain an operation mode changeover control in the electronic apparatus of the embodiment;

DETAILED DESCRIPTION OF THE INVENTION

An embodiment of the present invention will be described below with reference to the accompanying drawings.

Figure 1:
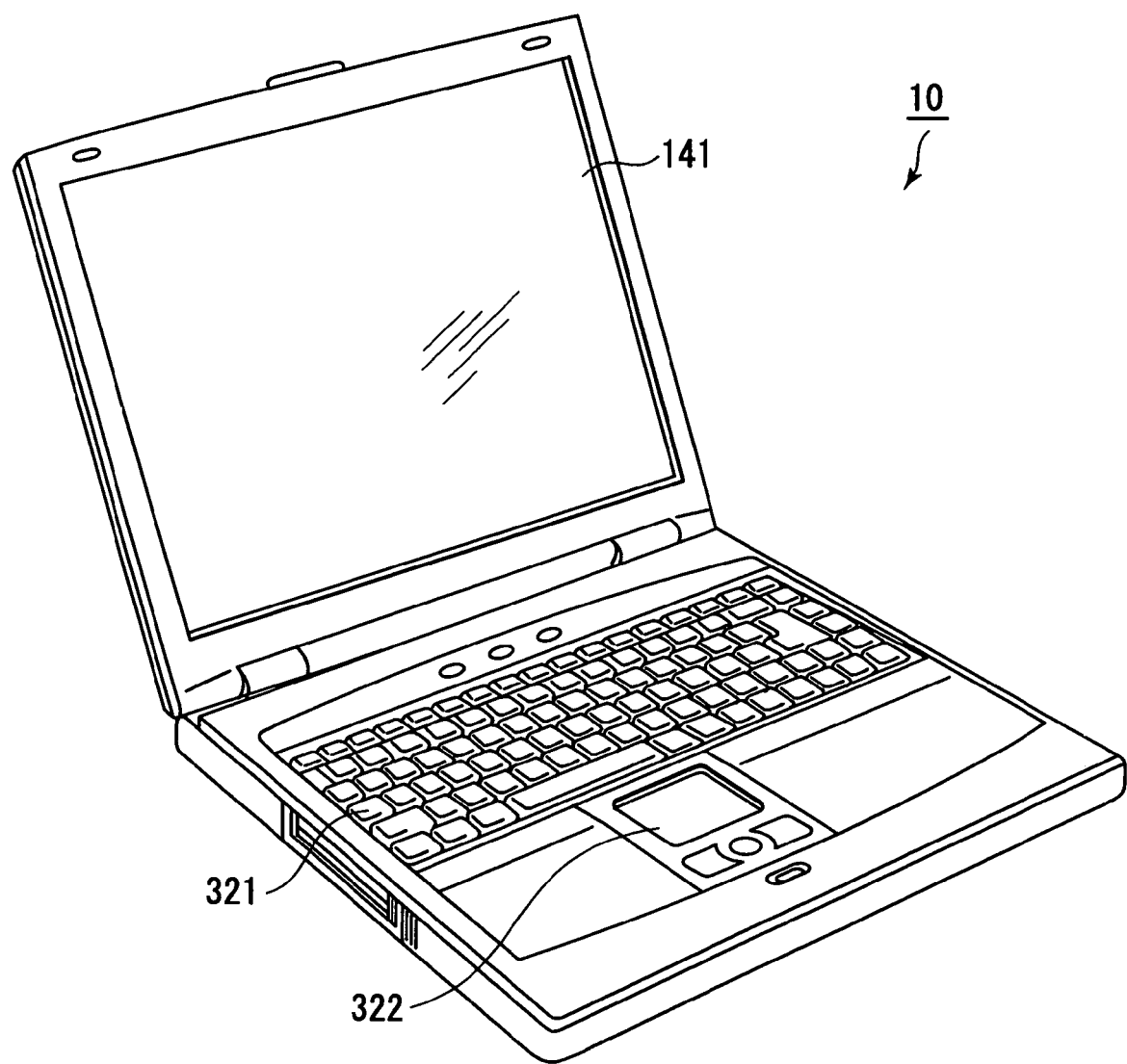
FIG. 1 is a view showing the appearance of an electronic apparatus according to an embodiment of the present invention.

FIG. 1 is a view showing the appearance of an electronic apparatus according to an embodiment of the present invention.

An electronic apparatus 10 of the embodiment is a battery-driving notebook-sized personal computer. As shown in FIG. 1, the computer main body is provided with a cover, which has an LCD (Liquid Crystal Display) 141 for screen display at its inner surface. The cover is attached to the computer main body to freely open and close via a hinge mechanism. The computer main body is provided with a keyboard 321 for character input and a touch pad 322 for position input at its upper surface.

Figure 2:
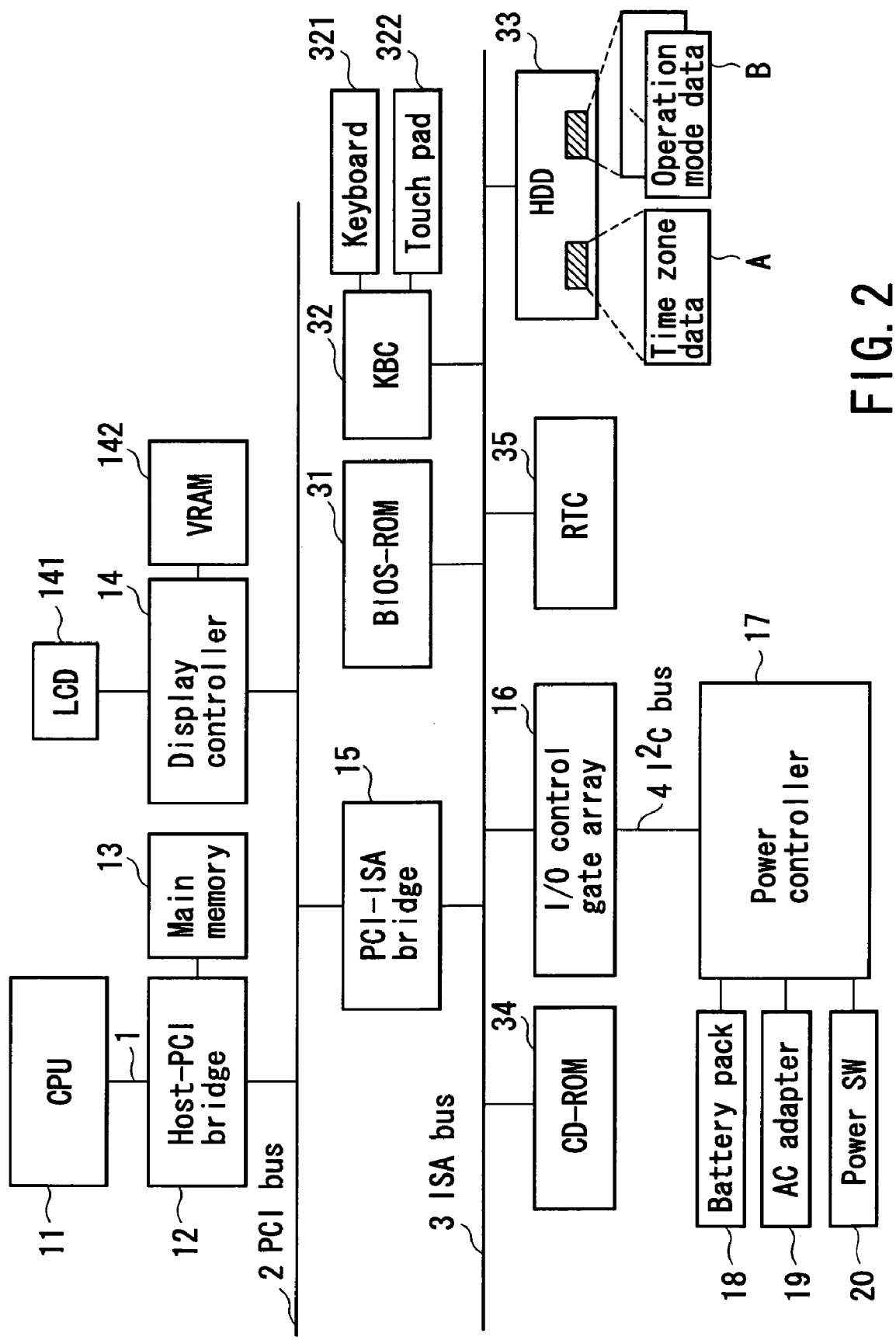
FIG. 2 is a block diagram showing the system configuration of the electronic apparatus of the embodiment.

FIG. 2 is a block diagram showing the system configuration of the electronic apparatus 10.

As seen from FIG. 2, the electronic apparatus 10 is provided with a processor bus 1, a PCI bus 2, an ISA bus 3, an I2C bus 4, a CPU 11, a host-PCI bridge 12, a main memory 13, a display controller 14. Further, the electronic apparatus 10 is provided with a PCI-ISA bridge 15, an I/O control gate array 16, a power controller 17, a BIOS-ROM 31, a keyboard controller (KBC) 32, a HDD 33, a CD-ROM 34 and a real-time clock (RTC) 35.

The CPU 11 executes programs stored in the main memory 13 to control the entirety of the system. The main memory 13 stores an operating system, a device driver and executable application programs executed by the CPU 11, and processing data.

The host-PCI bridge 12 is a bridge LSI interposed between the processor bus 1 and the PCI bus 2. The host-PCI bridge 12 has the following functions. One is a function of making bi-directional conversion of bus cycles including data and address. Another is a function of controlling the access of the main memory 13 via memory bus. The display controller 14 displays image data rendered in a video memory (VRAM) 142 on the LCD 141.

The PCI-ISA bridge 15 is a bridge LSI interposed between the PCI bus 2 and the ISA bus 3. The ISA bus 3 is connected with the BIOS-ROM 31 storing system BIOS, the KBC 32 controlling the keyboard 321 and the touch pad 322, the HDD 33, the CD-ROM 34, the RTC 35, the I/O control gate array 16, etc. The RTC 35 is a clock module having a self-operating battery.

The I/O control gate array 16 is a bridge LSI interposed between the ISA bus 3 and the I2C bus 4. The I/O control gate array 16 includes several register groups readable/writable by the CPU 11. The register groups are used, and thereby, communications are possible between the CPU 11 and the power controller 17.

A battery pack 18 includes a chargeable secondary battery such as nickel hydrogen battery and lithium ion battery. The battery pack 18 is removably mounted to the computer main body. In addition, the battery pack 18 has a built-in EEPROM. The EEPROM stores battery information showing a kind of secondary battery, residual capacity and low battery detection voltage. The battery information is readable by the power controller 17, and used for battery charge control and system power control.

The power controller 17 controls system power on/off in accordance with the operation of a power switch 20, and supplies operating power to each unit included in the system using the battery pack 18 or AC adapter 19. The power controller 17 has a built-in microcomputer for charge/discharge control to keep the operating state in power-off of the system.

Figure 3:
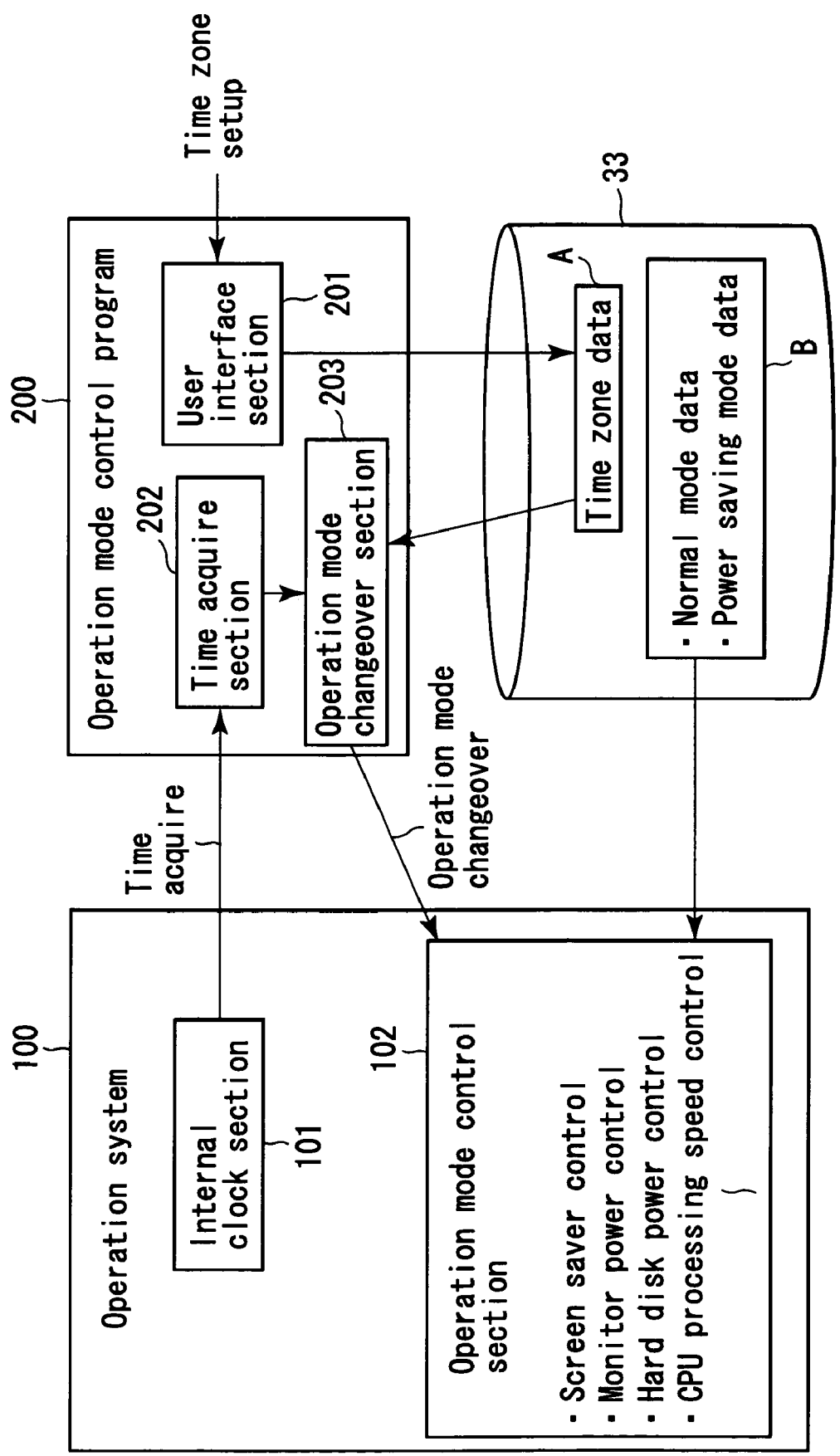
FIG. 3 is a functional block diagram to explain changeover control of system environment setup executed by the electronic apparatus of the embodiment.

FIG. 3 is a functional block diagram to explain the operation mode changeover control carried out by the electronic apparatus 10.

The electronic apparatus 10 has two modes, that is, a normal mode for making a normal operation and a power saving mode for making a power saving operation. The electronic apparatus 10 includes mechanism for making a changeover of two operation modes in accordance with time zone, thereby realizing peak cut. The features will be described below in detail.

An operation mode control program 200 operating under the control of an operating system 100 carries out the changeover control of two operation modes. The operation mode control program 200 is recorded and distributed to an optical disk, which is readable by the CD-ROM 34. The program 200 is installed in the HDD 33 via the CD-ROM 34, and thereafter, loaded to the main memory 13 and started by the CPU 11. The operation mode control program 200 has user interface section 201, time acquire section 202 and operation mode changeover section 203.

The user interface section 201 enables the user to set time zone corresponding to each operation mode. The user interface section 201 suggests the setup screen to the user via the LCD 141, and inputs contents set by the user on the screen from the keyboard 321 and the touch pad 322. In addition, the user interface section 201 stores the set time zone in the HDD (time zone data A).

The time require section 202 requires system time counted by an internal clock section 101 of the operating system 100 using the RTC 35, and transfers the acquired system time to the operation mode changeover section 203.

The operation mode changeover section 203 compares the system time received from the time acquire section 202 with the time zone data stored in the HDD 33 by the user interface section 201. As the need arises, the operation mode changeover section 203 gives operation mode changeover instructions to an operation mode control section 102 of the operating system 100. The operation mode control section 102 carries out screen saver control, monitor power control, hard disk power control and CPU processing speed control. The screen saver control inhibits the start of screen saver. The monitor power control turns off the LCD 141 after the operations of the keyboard 321 and the touch pad 322 stops beyond predetermined time. The hard disk control turns off the HDD 33 after data access stops beyond predetermined time. The CPU processing speed control reduces the processing speed of the CPU. In the normal or power saving mode, each control operation is defined by operation mode data B stored in the HDD 33. Here, in only power saving mode, the operation mode data B is prepared to inhibit the start of the screen saver, turn off the LCD 141 and the HDD 33, and reduce the processing speed of the CPU.

The user of the electronic apparatus 10 has an idea of setting two operation modes as shown in FIG. 4. More specifically, the power saving mode is applied to power consumption concentrating time zone (peak time zone), that is, time zone 12:00 to 16:00. On the other hand, the normal mode is applied to other time, that is, time zone 16:00 to the next 12:00. In this case, the user sets time zone (i.e., 12:00 to 16:00) corresponding to the power saving mode on the operation mode time setup screen displayed on the LCD 141 by the user interface section 201 as shown in FIG. 5. The operation mode time setup screen is provided with the following areas (a1) and (a2). The area (a1) is used to set the time zone corresponding to the power saving mode, and the area (a2) is used to stop the changeover from the normal mode to the power saving mode.

Figure 7:
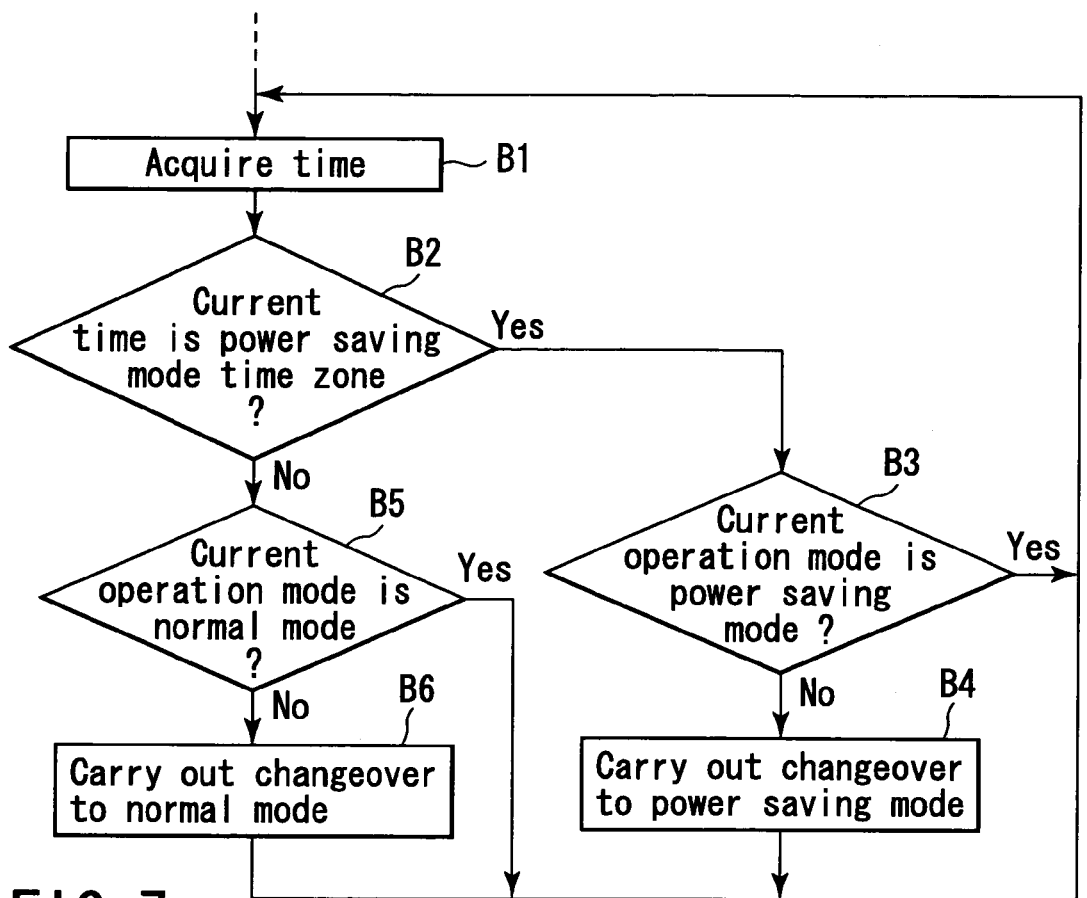
FIG. 7 is a second flowchart to explain the operation mode changeover control in the electronic apparatus of the embodiment.

FIG. 6 and FIG. 7 are flowcharts to explain the operation mode changeover control in the electronic apparatus 10.

According to the operation mode changeover control by the operation mode control program 200, the user interface section 201 sets time zone corresponding to each operation mode (step A1 in FIG. 6). The operation mode changeover section 203 controls the operation mode changeover based on the set time zone while receiving system time from the time acquire section 202 (step A2 in FIG. 7). FIG. 7 is a flowchart showing the operation mode changeover control in detail.

The time acquire section 202 periodically acquires system time from the internal clock section 101 of the operating system 100, and transfers the system time to the operation mode changeover section 203 (step B1 in FIG. 7). The operation mode changeover section 203 receiving the system time determines whether the current time belongs to which time zone set by the user interface section 201. Thereafter, the operation mode changeover section 203 carries out the operation mode changeover based on the result. More specifically, the operation mode changeover section 203 determines whether or not the current time is the time zone using the power saving mode (step B2 in FIG. 7). If so (YES of step B2 in FIG. 7), the operation mode changeover section 203 determines whether or not the currently using operation mode is the power saving mode (step B3 in FIG. 7). If not so (NO of step B3 in FIG. 7), the operation mode changeover section 203 gives instructions for the changeover to the power saving mode to the operation mode control section 102 of the operating system 100 (step B4 in FIG. 7).

If the current time is not the time zone using the power saving mode, that is, the time zone using the normal mode (NO of step B2 in FIG. 7), the operation mode changeover section 203 determines whether or not the currently using operation mode is the normal mode (step B5 in FIG. 7). If not so (NO of step B5 in FIG. 7), the operation mode changeover section 203 gives instructions for the changeover to the normal mode to the operation mode control section 102 of the operating system 100 (step B6 in FIG. 7).

In the embodiment, the time acquire section 202 periodically acquires the system time from the internal clock section 101 of the operating system 100. The operation mode changeover section 203 may refer to time zone data A stored in the HDD 33 by the user interface section 201 to find the operation mode changeover time. Thereafter, the operation mode changeover section 203 may give the time to the time acquire section 202. In this case, the time acquire section 202 makes a request to return information when the profile changeover time comes with respect to the internal clock section 101 of the operating system. If the information is returned, the time acquire section 202 gives the time arrival information to the operation mode changeover section 203.

As described above, the operation mode control program 200 carries out the operation mode changeover control. By doing so, the electronic apparatus 10 can properly use several operation modes in accordance with time zone, so that the operation mode changeover can be automatically carried out.

Figure 8:
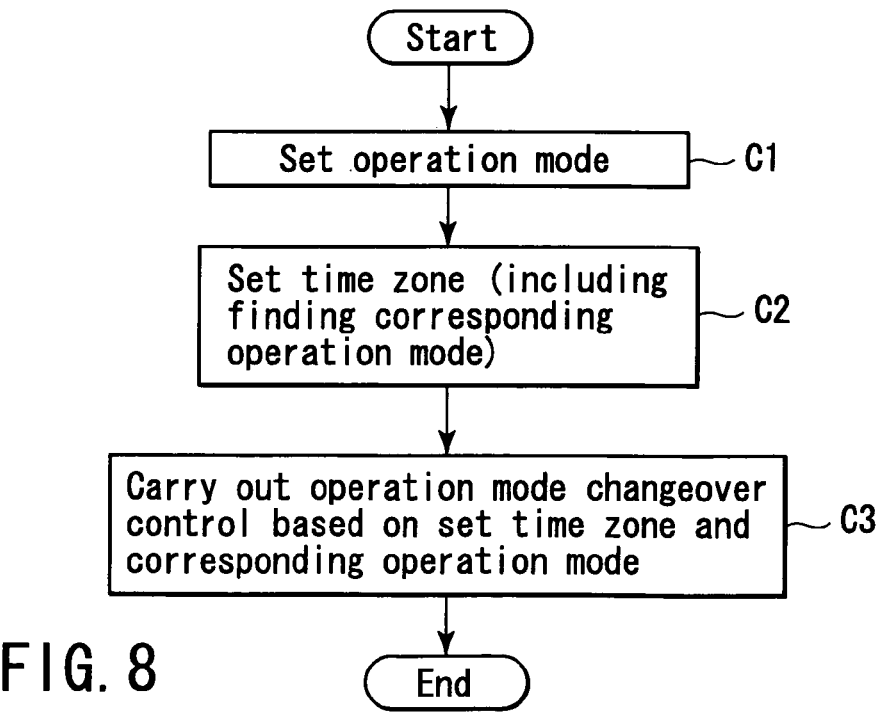
FIG. 8 is a third flowchart to explain the operation mode changeover control in the electronic apparatus of the embodiment.

The above is the description on the example that arbitrary time zone is made correspondent to the operation modes prepared on the system side; in this case, the user may set the operation modes. FIG. 8 is a view showing an operation mode changeover control in the case described above.

The user interface section 201 of the operation mode control program 200 sets operation modes (step C1 in FIG. 8), time zone and operation modes corresponding to the time zone (step C2 in FIG. 8). The operation mode changeover section 203 carries out the operation mode changeover control based on the set time zone and the corresponding operation mode while receiving the system time from the time acquire section 202 (step C3 in FIG. 8).

As described above, the user sets the operation modes, and thereby, it is possible to realize peak cut having high flexibility in accordance with use's condition and circumstances.

In addition, mechanism for automatically changing the operation mode in accordance with time zone is provided as describe before, and thereby, the following effect is obtained. Namely, silence mode for preventing noise in the night may be employed, in addition to power saving control such as peak cut. In order to achieve the silence mode, various methods of preventing noise have been proposed. For example, one is a method of carrying out temperature control giving priority to the speed reduction of the CPU 11 rather than the drive of cooling fan (not shown). Another is a method of making late the driving speed of the CD-ROM 34.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus having a plurality of operation modes, comprising:
    an operation mode setting unit configured to set the operation modes;
    a time zone setting unit configured to set a time zone information for carrying out each operation mode of the electronic apparatus;
    an operation mode acquisition unit configured to acquire a current operation mode;
    an operation mode determination unit configured to independently determine whether or not the current operation mode acquired by the operation mode acquisition unit corresponds to a desired operation mode by determining whether or not a current time belongs to a time zone of the acquired current operation mode indicated by the time zone information set by the time zone setting unit;
    a control unit configured to carry out an operation mode changeover to set the desired operation mode if the operation mode determination unit determines that the current operation mode does not correspond to the desired operation mode; and
    an operation mode control unit configured to carry out at least one of screen saver control, monitor power control, hard disk power control, and CPU processing speed control based upon the desired operation mode.

2. The apparatus according to claim 1, wherein the operation modes include a first operation mode and a second operation mode,
    the operation mode control unit turning off a monitor when no operation of the apparatus is made beyond a first time in the first operation mode, and turning off the monitor when no operation to the apparatus is made beyond a second time shorter than the first time in the second operation mode.

3. The apparatus according to claim 1, wherein the operation modes include a first operation mode and a second operation mode, the operation mode control unit turning off a hard disk drive when no access is made beyond a first time in the first operation mode, and turning off the hard disk drive when no access is made beyond a second time shorter than the first time in the second operation mode.

4. The apparatus according to claim 1, wherein the operation modes include a first operation mode and a second operation mode, the operation mode control unit driving an optical disk drive at a first speed in the first operation mode, and driving the optical disk drive at a second speed lower than the first speed in the second operation mode.

5. The apparatus according to claim 1, wherein the plurality of operation modes include a normal operation mode and a power save mode; and only in the power save mode, the screen saver control inhibits start of a screen saver, the monitor power control turns off a monitor after a pre-determined time period since operations of a keyboard and a touch pad stopped, the hard disk control turns off a hard disk after a pre-determined time period since data access to the hard disk stopped, and the CPU processing speed control reduces a processing speed of a CPU.

6. An operation controlling method of an electronic apparatus including a plurality of operation modes, comprising:

setting the operation modes;

setting a time zone information for carrying out each operation mode of the electronic apparatus;

acquiring a current operation mode;

independently determine whether or not the acquired current operation mode corresponds to a desired operation mode by determining whether or not a current time belongs to a time zone of the acquired current operation mode indicated by the set time zone information;

carrying out an operation mode changeover to set the desired operation mode if the current operation mode does not correspond to the desired operation mode; and carrying out at least one of screen saver control, monitor power control, hard disk power control, and CPU processing speed control based upon the desired operation mode.

\* \* \* \* \*